United States Patent [19]
Bomal et al.

[11] Patent Number: 5,929,166
[45] Date of Patent: Jul. 27, 1999

[54] SILICONE COMPOUNDS CONTAINING A PHENYLENEDIAMINE FUNCTIONAL GROUP AND THEIR APPLICATION IN THE PROTECTION OF RUBBER MATERIALS AGAINST OZONE

[75] Inventors: Yves Bomal, Paris; Philippe Karrer, Lyons; Jean-Manuel Mas, Millery; Gérard Mignani, Lyons, all of France

[73] Assignee: Rhone-Poulenc Chimie, Courbevoie, France

[21] Appl. No.: 08/979,498

[22] Filed: Nov. 26, 1997

Related U.S. Application Data

[62] Division of application No. 08/644,028, May 9, 1996, Pat. No. 5,733,999.

[30] Foreign Application Priority Data

May 10, 1995 [FR] France .................................... 95 05728

[51] Int. Cl.⁶ ...................................................... C08F 8/30
[52] U.S. Cl. ........................... 525/102; 525/104; 525/105; 525/106; 156/110.1; 264/171.24
[58] Field of Search ..................................... 525/102, 104, 525/105, 106; 156/110.1; 264/171.24

[56] References Cited

U.S. PATENT DOCUMENTS 5,733,999  3/1998  Bomal et al. .............................. 528/38

*Primary Examiner*—Margaret W. Glass
*Attorney, Agent, or Firm*—Andrew M. Solomon

[57] ABSTRACT

The present invention relates to compounds composed essentially of a linear, cyclic or branched polyorganosiloxane having, per molecule, at least 3 siloxy units, including at least one siloxy functional unit of formula:

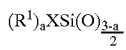

$$(R^1)_a X Si(O)_{\frac{3-a}{2}}$$

where $R^1$ represents a $C_1$ to $C_4$ alkyl or phenyl radical, X contains an N,N'-di- and/or trisubstituted phenylenediamine functional group, bonded to the silicon via an Si-(hydrocarbon linking unit)-N and/or Si-(hydrocarbon linking unit)-C bond, and a is a number chosen from 0, 1 and 2. The present invention also relates to the use of such compounds as antiozonants for rubbers and in particular for rubber compositions for tires.

14 Claims, No Drawings

SILICONE COMPOUNDS CONTAINING A PHENYLENEDIAMINE FUNCTIONAL GROUP AND THEIR APPLICATION IN THE PROTECTION OF RUBBER MATERIALS AGAINST OZONE

This application is a division of application Ser. No. 08/644,028 filed May 9, 1996 which application is now U.S. Pat. No. 5,733,999.

The present invention relates, in its first subject, to new compounds composed essentially of a polyorganosiloxane comprising, per molecule, at least one N,N'-di- and/or trisubstituted phenylenediamine bonded to the silicon atom via Si-N and/or Si-C bonds and optionally at least one other compatibilized functional group also bonded to the silicon via an Si-C bond. It also relates, in a second subject, to processes for the preparation of the said silicone-based compounds. It further relates, in a third subject, to the use of such compounds as antiozonants for rubbers and in particular for rubber compositions for tires.

The stability with regard to ageing of rubbers is greatly influenced by the effect of heat, of light and of atmospheric agents, in particular ozone. The degradation of rubbers by ozone (in the form of traces in the air) is a kinetic process taking place at the surface of the polymer material which involves ozone and the ethylenic double bonds of the rubber and causes surface cracks. It is known that dynamic phenomena accentuate the effects of ozone so that, in the case of compositions for tires, it is necessary to have an antiozonant which remains active under the effect of dynamic stresses.

This degradation is generally limited by the introduction into the rubber of small amounts of antiozonants. Among these antiozonants, the most effective antiozonants are currently para-phenylenediamines, in particular: N-phenyl-N'-(1,3-dimethylbutyl)-p-phenylenediamine, N-phenyl-N'-isopropyl-p-phenylenediamine, N-phenyl-N'-cyclohexyl-p-phenylenediamine, N,N'-bis(1-methylheptyl)-p-phenylenediamine and mixtures of these materials with each other or mixtures of at least one of these materials with film-forming waxes (for example of the paraffin type or of the microcrystalline wax type).

The use of these para-phenylenediamines has made it possible to improve the protection against ozone, both under static conditions and under dynamic conditions, but, however, a major disadvantage which arises, even with the best materials of the family which has just been described, lies in the fact that para-phenylenediamines bring about the formation of stains and of discolorations at the surface of the rubber material. The words "stains" and "discolorations" are used in this instance to describe the tendency of these antiozonants, on the one hand, to partly migrate to the surface of the rubber material and, on the other hand, to partly exude outside this surface, producing a brown efflorescence thereon. This colouring by exudation is very inconvenient in the majority of light-coloured rubber articles. In tires, which is the largest application where protection against ozone is necessary, the tendency towards colouring by exudation is inconvenient, in particular in tires of the type with white sidewalls. Even in tires of the type without white sidewalls, the tendency of the materials to exude can be inconvenient because of the fact that a brown and drab surface is created on the sidewall of the tire. This is aesthetically displeasing and, moreover, results in a loss of the material which protects against ozone and, consequently, in a reduction in its effectiveness.

For more details on the use of antiozonants based on para-phenylenediamines and on the problem of staining, reference may be made in particular to the contents of the following documents: R. W. Layer and R. P. Lattimer, Rubber Chem. and Techno. 63(3), 426 (1990), J. Pospisil, Developments Series: Developments in Polymer Stabilisation, Chapter 1, entitled "Aromatic Amine Antidegradants", published by "Elsevier Applied Science" in 1984.

An aim of the present invention is to provide a new antiozonant which is highly effective in protecting a rubber article, in particular of the type of those subject to a dynamic stress during periods of exposure to ozone; this implies excellent mobility of the antiozonant within the rubber material in order to partly migrate to the surface of the material where the ozonization reactions take place.

Another aim of the invention is to provide protection against ozone which confers on the rubber material a resistance to flexural fatigue which is equivalent, indeed better, than that conferred by the best protective materials belonging to the family described above, in particular mixtures of N-phenyl-N'-(1,3-dimethylbutyl)-p-phenylenediamine with a film-forming wax.

Yet another aim of the invention, and it constitutes the major aim to be achieved, is to provide a material for protection against ozone which, by controlled compatibilizing action with the rubber material having the effect of slowing down and of even stopping the phenomenon of exudation of the antiozonant outside the surface of the rubber material, contributes to improving the permanence of the antiozone properties and does not produce a displeasing brown efflorescence on a black or white surface.

It has now been found, in accordance with the present invention, that these aims could be achieved by virtue of the use of compounds composed essentially of a polyorganosiloxane comprising, in their molecule, at least one N,N'-di- and/or trisubstituted phenylenediamine functional group.

More precisely, the present invention relates, in its first subject, to new compounds composed essentially of a polyorganosiloxane comprising, per molecule, at least 3 siloxy units, including at least one siloxy functional unit of formula:

(I)

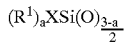

in which:

the symbols $R^1$ are identical or different and each represent a monovalent hydrocarbon radical chosen from the linear or branched alkyl radicals having from 1 to 4 carbon atoms and the phenyl radical; the symbols X are identical or different and each represent a group comprising an N,N'-di- and/or trisubstituted phenylenedi amine functional group bonded to a silicon atom via an Si-(hydrocarbon linking unit)-N and/or Si-(hydrocarbon linking unit)-C bond;

a is a number chosen from 0, 1 and 2.

The polyorganosiloxane can additionally have at least one other functional unit of formula:

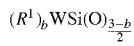 (II)

in which the symbols $R^1$ have the same meanings as those given above with respect to the formula (I);

the symbol W represents a monovalent group containing a compatibilizing functional group chosen from: a linear or branched alkyl radical having more than 4 carbon atoms; a radical of formula —$R^2$—COO—$R^3$ in which $R^2$ represents a linear or branched alkylene radical having from 5 to 20 carbon atoms and $R^3$ represents a linear or branched alkyl radical having from 1 to 12 carbon atoms; a radical of formula —$R^4$—O—($R^5$—O)$_c$—$R^6$ in which $R^4$ represents a linear or branched alkylene radical having from 3 to 15 carbon atoms, $R^5$ represents a linear or branched alkylene radical having from 1 to 3 carbon atoms, c is a number from 0 to 10 and $R^6$ represents a hydrogen atom, a linear or branched alkyl radical having from 1 to 12 carbon atoms or an acyl radical —CO—$R^7$ where $R^7$ represents a linear or branched alkyl radical having from 1 to 11 carbon atoms;

b is a number chosen from 0, 1 and 2.

The other possible siloxy unit(s) of the polyorganosiloxane correspond(s) to the formula:

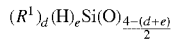 (III)

in which the symbols $R^1$ have the same meanings as those given above with respect to the formula (I);

d is a number chosen from 0, 1, 2 and 3;

e is a number chosen from 0 and 1;

the sum d+e is not greater than 3.

The siloxy units of formula (I), when there are more than two of them, can be identical to or different from one another; the same comment also applies to the siloxy units of formulae (II) and (III).

In the present statement, the following definitions will be understood to apply:

"phenylenediamine functional groups or PD functional groups": X groups;

"compatibilizing functional groups": optional monovalent W groups which are directly bonded to the silicon atoms (in this case, Si—C bonds are then formed);

"mixed organopolysiloxanes": organopolysiloxanes which have both PD functional group(s) and compatibilizing functional group(s).

Taking into account the values which the symbols a, b, d and e can take, it should further be understood that the polyorganosiloxanes coming within the scope of the invention can thus have a linear, cyclic or branched (resin) structure or a mixture of these structures. When it concerns linear polymers, the latter can optionally have up to 50 mol % of branching [units of "T" ($RSiO_{3/2}$) and/or "Q" ($SiO_{4/2}$) types].

When it concerns polyorganosiloxane resins, the latter are composed of at least two types of different siloxy units, namely "M" ($R_3SiO_{1/2}$) and/or "T" units and optionally "D" ($R_2SiO_{2/2}$) units; the number of "M" units/number of "Q" and/or "T" units ratio is generally between 4/1 and 0.5/1 and the number of "D" units/number of "Q" and/or "T" units ratio is generally between 0 and 100/1.

The numbers of the units of formula (I), and optionally (II) and (III), are advantageously such that the polyorganosiloxanes coming within the scope of the invention contain:

at least 0.5 mol %, preferably from 10 to 90 mol %, of PD functional groups, and optionally at least 0.5 mol %, preferably from 10 to 90 mol %, of compatibilizing functional groups. The mol % values indicated express the number of moles of functional groups per 100 silicon atoms.

As indicated above, the present invention, taken in its first subject, relates to new compounds composed essentially of a polyorganosiloxane comprising, per molecule, siloxy units of formula (I) and optionally (II) and (III): the expression "essentially" must be interpreted as meaning that the polyorganosiloxanes coming within the scope of the present invention can exist in the pure state or in the form of a mixture with at most 5% by weight of an N,N'-di- and/or trisubstituted phenylenediamine in the free state. This phenylenediamine which is not grafted onto the silicone chain can be the starting phenylenediamine from which is (are) prepared the ethylenically unsaturated precursor(s) from which the X group(s) derive(s).

The preferred $R^1$ radicals are: methyl, ethyl, n-propyl, isopropyl or n-butyl; more preferentially, at least 80 mol % of the $R^1$ radicals are methyls.

The PD functional groups represented by the X symbols are preferably chosen from the radicals of formulae:

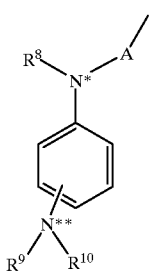 (IV-i)

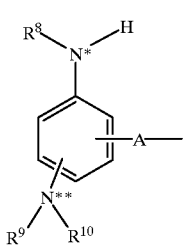 (IV-2i)

-continued (IV-3i)

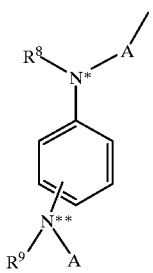

(IV-4i)

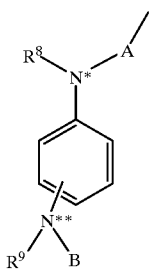

and their mixtures, in which formulae:

A is a divalent organic radical of formula:

—$(D)_f$—$CHR^{11}$—$CH_2$═ where: D is a linear or branched alkylene residue having from 1 to 10 carbon atoms, with f being a number equal to 0 or 1; $R^{11}$ is a hydrogen atom or a linear or branched alkyl radical having from 1 to 3 carbon atoms; the thick right-hand free valency is that which is connected to a silicon atom, whereas the other left-hand free valency is connected to a nitrogen atom;

B is a monovalent organic radical of formula:

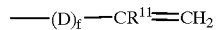
—$(D)_f$—$CR^{11}$═$CH_2$ where the D, f and $R^{11}$ symbols have the meanings given above with respect to the A radical;

the $R^8$ and $R^9$ radicals, which are identical or different, are chosen from linear or branched alkyl radicals having from 3 to 18 carbon atoms, cycloalkyl radicals having from 4 to 12 carbon atoms, the phenyl radical, the benzyl radical and the naphthyl radical;

$R^{10}$, which can be identical to $R^8$ and/or $R^9$, is chosen from a hydrogen atom and one of the radicals represented by $R^8$ and $R^9$;

each amino residue

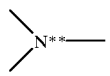

of a benzene ring is in the ortho, meta or para position with respect to the other amino residue

the A radical of the formula (I-2i) is in the ortho or para position with respect to the amino residue

at least one of the functional groups X corresponds to the formula (IV-i) or (IV-2i), and when, if appropriate, there is present a mixture of functional groups X of formulae (IV-i) and/or (IV-2i) with functional groups X of formulae (IV-3i) and optionally (IV-4i), the number of functional groups X of formulae (IV-3i) and optionally (IV-4i) grafted onto a linear or branched polyorganosiloxane chain is on average strictly less than 2.

The functional groups X are more preferentially chosen from the groups of formulae (IV-i) to (IV-4i) and their mixtures, corresponding to the preferential form defined above, in which:

A is chosen from divalent radicals of formula

—D—$CH_2$—$CH_2$■

(in this case, f=1 and $R^{11}$=H), where D is a —$(CH_2)_g$— residue with g being a number from 1 to 6;

B is chosen from monovalent radicals of formula

—D—CH═$CH_2$, where the D symbol has the meaning given above with respect to A;

the $R^8$ and $R^9$ radicals, which are identical, represent branched alkyl radicals having from 3 to 8 carbon atoms, in particular alkyl radicals of this type in the structure of which the carbon carrying the free valency is bonded to a hydrogen atom and to two carbon atoms, for example the isopropyl, sec-butyl, 1,3-dimethylbutyl, 1,4-dimethylpentyl and 1-methylheptyl radicals; $R^{10}$ represents a hydrogen atom;

each amino residue

is in the para position with respect to the other amino residue

The preferred optional compatibilizing functional groups W are chosen: from a linear or branched alkyl radical having from 5 to 18 carbon atoms; a radical of formula —$R^2$—COO—$R^3$ in which $R^2$ represents a linear or branched alkylene radical having from 8 to 12 carbon atoms and $R^3$ represents a linear or branched alkyl radical having from 1 to 6 carbon atoms; or a radical of formula $-R^4-O-(R^5-O)_c-R^6$ in which $R^4$ represents a linear or branched alkylene radical having from 3 to 6 carbon atoms, $R^5$ represents a linear or branched alkylene radical having from 2 to 3 carbon atoms, c is a number from 0 to 6 and $R^6$ represents a hydrogen atom, a linear or branched alkyl radical having from 1 to 6 carbon atoms or an acyl radical $-CO-R^7$ where $R^7$ represents a linear or branched alkyl radical having from 1 to 5 carbon atoms.

The compatibilizing functional groups W are more preferentially chosen from the n-octyl, n-undecyl, n-dodecyl, n-tridecyl or methyl or ethyl decamethylenecarboxylate radicals.

The present invention, taken in its first subject, is more precisely still targeted at:

compounds composed essentially of statistical, sequenced or block, linear, optionally mixed polyorganosiloxane polymers of average formula:

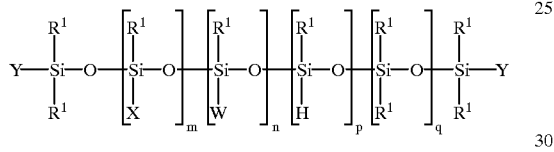

(V)

in which:
the symbols $R^1$, X and W have the general meanings given above with respect to the formulae (I) and (II);
the symbols Y represent a monovalent radical chosen from $R^1$, X, W and a hydrogen atom;
m is a whole or fractional number ranging from 0 to 180;
n is a whole or fractional number ranging from 0 to 180;
p is a whole or fractional number ranging from 0 to 10;
q is a whole or fractional number ranging from 0 to 100;
with the conditions according to which:
if m is other than 0 and, in the optional case of mixed polymers, if n is other than 0: the sum m+n+p+q lies in the range from 5 to 200; the ratio 100m/(m+n+p+q+2)≧0.5; and the ratio 100n/(m+n+p+q+2)≧0.5, this ratio being identical to or different from the preceding ratio;
if m=0 and, in the optional case of mixed polymers, if n is other than 0: at least one of the Y substituents represents the X radical; the sum n+p+q lies in the range from 5 to 100; and the ratio 100n/(n+p+q+2)≧0.5,
if m is other than 0 and n=0: the sum m+p+q lies in the range from 5 to 100; the ratio 100m/(m+p+q+2)≧0.5; and, in the optional case of mixed polymers, at least one of the Y substituents represents the W radical;
if m=0 and n=0: the sum p+q lies in the range from 5 to 100; one of the Y substituents being the X radical; and, in the optional case of mixed polymers, the other Y substituent being the W radical; and
with the additional condition according to which, if m is other than 0 and if X comprises functional groups of formulae (IV-3i) and optionally (IV-4i), each of the three following products:
the product (m+1)×G, when only one of the Y substituents represents the X radical, or
the product (m+2)×G, when both the Y substituents represent the X radical, or
the product m×G, when both the Y substituents represent the $R^1$ and/or W radicals, is strictly less than 2, where G is the molar fraction of the functional groups X of formulae (IV-3i) and optionally (IV-4i) in the combined functional groups X of structure (IV);
and those of average formula:

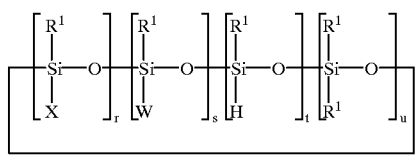

(VI)

in which:
the symbols $R^1$, X and W have the general meanings given above with respect to the formulae (I) and (II);
r is a whole or fractional number ranging from 1 to 9;
s is a whole or fractional number ranging from 0 to 9;
t is a whole or fractional number ranging from 0 to 0.5;
u is a whole or fractional number ranging from 0 to 5;
the sum r+s+t+u lies in the range from 3 to 10;
with the condition according to which, if X comprises functional groups of formulae (IV-3i) and optionally (IV-4i), the product r×G is strictly less than 2, G being the molar fraction defined above with respect to the formula (V).

The polymers of formula (V) which are preferred (so-called LP1 polymers) or highly preferred (so-called LP2 polymers) are those in which:
the symbols Y represent $R^1$;
m is a whole or fractional number ranging from 1 to 90;
n is a whole or fractional number ranging from 0 to 90;
p is a whole or fractional number ranging from 0 to 5;
q is a whole or fractional number ranging from 0 to 50;
the sum m+n+p+q is a whole or fractional number ranging from 10 to 100;
the ratio 100m/(m+n+p+q+2) lies in the range from 10 to 90;
with the condition according to which if n is other than 0, the ratio 100n/(m+n+p+q+2) lies in the range from 10 to 90, it being possible for this ratio to be identical to or different from the preceding ratio; and
with the additional condition according to which, if X comprises functional groups of formulae (IV-3i) and optionally (IV-4i), the product m×G is strictly less than 2, G being the molar fraction defined above with respect to the formula (V);
the $R^1$, X and W radicals simultaneously have the preferential definitions (in the case of LP1 polymers) or more preferential definitions (in the case of LP2 polymers) given above with respect to each of them.

The polymers of formula (VI) which are preferred (so-called CP1 polymers) or very preferred (so-called CP2 polymers) are those in which:

r is a whole or fractional number ranging from 1 to 4.5;
s is a whole or fractional number ranging from 0 to 4.5;
t is a whole or fractional number ranging from 0 to 0.25;
u is a whole or fractional number ranging from 0 to 2.5;
the sum r+s+t+u is a whole or fractional number ranging from 3 to 5;
with the condition according to which, if X comprises functional groups of formulae (IV-3i) and optionally (IV-4i), the product r×G is strictly less than 2, G being the molar fraction defined above with respect to the formula (V);
the $R^1$, X and W radicals simultaneously have the preferential definitions (in the case of the CP1 polymers) or more preferential definitions (in the case of the CP2 polymers) given above with respect to each of them.

The polymers of formula (V), which are especially well-suited (so-called ELP1 polymers) or very especially well-suited (so-called ELP2 polymers) are the LP1 or LP2 polymers defined above in which the symbol n is a number ranging from 1 to 90.

The polymers of formula (VI), which are especially well-suited (so-called ECP1 polymers) or very especially well-suited (so-called ECP2 polymers) are the CP1 or CP2 polymers defined above in which the symbol s is a number ranging from 1 to 4.5.

The compounds according to the invention composed essentially of optionally mixed organopolysiloxanes can advantageously be obtained from, and this constitutes the second subject of the invention:

corresponding organohydropolysiloxanes (H), which are free of PD functional group(s) X and of compatibilizing functional group(s) W, the organic compound(s) which is(are) ethylenically unsaturated (ψ), known as "precursor(s)" from which the PD functional group(s) represented by X derive(s), and optionally the compound(s) which is(are) ethylenically unsaturated at the chain end (Ξ), known as "precursor(s) (Ξ)", from which the W functional group(s) derive(s).

Thus, the optionally mixed polyorganosiloxanes of the invention can be obtained by carrying out:

in the case of polymers containing solely PD functional group(s): an addition (hydrosilylation) reaction, or
in the case of mixed polymers containing PD functional group(s) and containing compatibilizing functional group(s): two simultaneous or successive addition (hydrosilylation) reactions, starting with: corresponding organohydropolysiloxanes (H) free of the X and W functional groups, the precursor(s) (ψ), from which the X functional group(s) derive(s), and optionally the precursor(s) (Ξ), from which the W functional group(s) derive(s).

These hydrosilylation reactions can be carried out at a temperature of the order of 20 to 200° C., preferably of the order of 60 to 120° C., in the presence of a catalyst based on a metal of the platinum group; mention may in particular be made of the platinum derivatives and complex described in U.S. Pat. No. 3,715,334, U.S. Pat. No. 3,814,730, U.S. Pat. No. 3,159,601 or U.S. Pat. No. 3,159,662.

The amounts of catalysts used are of the order of 1 to 300 parts per million, expressed as metal with respect to the reaction mixture.

In the definition of the "mol of (ψ)", the olefinic unsaturation capable of reacting with (H) by hydrosilylation will be regarded as the unit entity. Likewise, in the definition of the "mol of (Ξ)", the olefinic unsaturation capable of reacting with (H) by hydrosilylation will be regarded as the unit entity.

The amounts of reactants which can be used generally correspond to a [(ψ)+optionally (Ξ)]/SiH [of (H)] molar ratio which is of the order of 1 to 5 and preferably of the order of 1 to 2.

The hydrosilylation reactions can take place in bulk or, preferably, in a volatile organic solvent such as toluene, xylene, methylcyclohexane, tetrahydrofuran, heptane, octane or isopropanol; the reaction mixture can additionally contain a buffer agent consisting in particular of an alkali metal salt of a monocarboxylic acid, such as, for example, sodium acetate.

At the end of the reactions, the optionally mixed polyorganosiloxanes which are obtained in the crude state may be as a mixture with:

the precursors (ψ) and/or (Ξ) charged in excess or unreacted, and/or
the organic solvent used, and/or
the starting phenylenediamine, from which is (are) is prepared the precursor(s) (ψ), and which has not been completely removed from the reaction mixture at the time of the preparation of the precursor(s) (ψ).

When such a mixture of products is obtained, if it is desired to be able then to have available an optionally mixed polyorganosiloxane which is free of impurity(ies), and this is a preferential form, a purification will be carried out, for example by simple evaporation of the excess or unreacted precursor (Ξ) and/or of the solvent used by heating carried out, for example, between 100° and 180° C. under reduced pressure of between 4 and 13.3×10² Pa and/or by simple extraction of the residual starting phenylenediamine and/or precursor (ψ) using, for example, a saturated aliphatic monoalcohol. It is alternatively possible to remove the excess or unreacted precursor (ψ) by simple evaporation carried out by heating carried out, for example, between 100° and 180° C. under reduced pressure of less than 0.133×10² Pa.

The organohydropolysiloxanes (H) which are used, for example, for the preparation of the linear mixed polydiorganosiloxanes of formula (V) are those of formula:

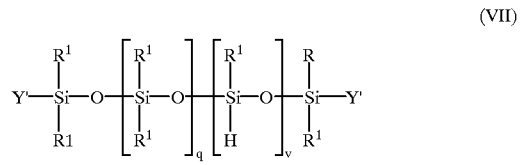

(VII)

in which:
the symbols $R^1$ and q have the general or preferential meanings given above with respect to the formula (V);
the symbols Y' represent $R^1$ or a hydrogen atom;
v is a whole or fractional number equal to m+n+p;
with the condition according to which, if v=0, q is a number lying in the range from 5 to 100 and then at least one of the Y' radicals represents a hydrogen atom.

The organohydropolysiloxanes (H) which are used, for example, for the preparation of the cyclic mixed polydiorganosiloxanes of formula (VI) are those of formula:

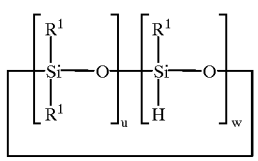
(VIII)

in which:
the symbols $R^1$ and u have the general or preferential meanings given above with respect to the formula (VI);
w is a whole or fractional number equal to r+s+t;
the sum u+w lies in the range from 3 to 10.

Such organohydropolysiloxanes (H) of formulae (VII) and (VIII) are known in the literature and some are commercially available.

The precursors (ψ), from which the functional groups X derive, are preferably the ethylenically unsaturated compounds formed by the phenylenediamines of formulae:

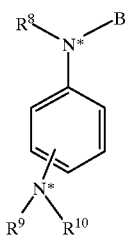
(IX-i)

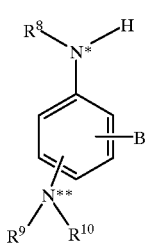
(IX-2i)

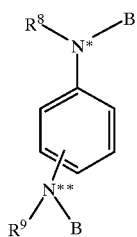
(IX-3i)

is and their mixtures,
the general or specific meanings of the symbols $R^8$, $R^9$, $R^{10}$ and B and the various possible positions of the groups

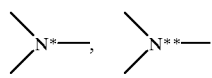

and B on the benzene rings being those indicated above with respect to the formulae (IV-i) to (IV-4i);
at least one of the precursors (ψ) corresponds to the formula (IX-i) or (IX-2i), and when, if appropriate, a mixture of precursors of formulae (IX-i) and/or (IX-2i) with a precursor of formula (IX-3i) is used, the molar fraction G' of precursor of formula (IX-3i) in the combined precursors of structure (IX) is determined so that, after carrying out the hydrosilylation reaction, the number of functional groups X of formulae (IV-3i) and optionally (IV-4i) which are derived therefrom, grafted onto a linear or branched polyorganosiloxane chain, is on average strictly less than 2.

In accordance with a more preferentially retained form, the reaction product in the crude state as obtained on conclusion of the implementation of the process which consists in reacting the phenylenediamine of formula:

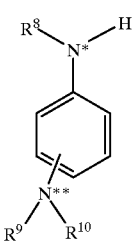
(X)

with a halogenated compound of formula:

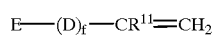
(XI)

$$E\!-\!(D)_f\!-\!CR^{11}\!=\!CH_2$$

where E represents a halogen atom, such as for example chlorine, bromine or iodine, whereas the symbols D, f and $R^{11}$ have the general or preferential meanings given above with respect to the formulae (IV-i) to (IV-4i), the synthesis being carried out in the presence of an appropriate amount of at least one tertiary amine, is used in the hydrosilylation reaction, if needs be after having subjected it to a purification stage.

The synthetic scheme is as follows:

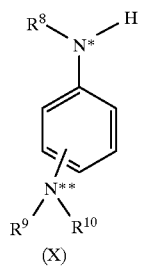
(X)     (XI)

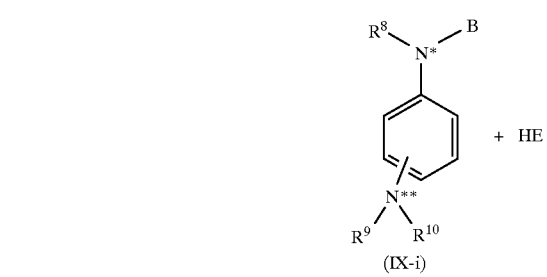
(IX-i)

the symbol B of the formula (IX-i) representing the monovalent radical

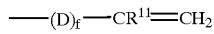
——(D)$_f$——CR$^{11}$══CH$_2$

It is possible for side reactions to result, in addition to the precursor of formula (IX-i), in the formation of a C-alkenylation compound corresponding to the precursor of formula (IX-2i). The molar proportion of the precursor of formula (IX-2i), when it is formed, expressed as mol % in the mixture of the precursors of formulae (IX-i)+(IX-2i), is generally at the most equal to 15%.

The degree of conversion of the starting phenylenediamine of formula (X) may not be complete (equal to 100%); in the case of an incomplete degree of conversion, unreacted starting diamine will remain in the reaction mixture at the end of the reaction and the crude reaction product will then be purified, for is example by distillation under reduced pressure, in order to remove all or, failing that, most of the unreacted starting diamine.

In the case where the R$^{10}$ substituent of the starting diamine of formula (X) is a hydrogen atom, the reaction then results in the formation of an additional N,N'-dialkenylation compound corresponding to the precursor of formula (IX-3i).

The molar fraction G' of the precursor of formula (IX-3i), in the mixture of the precursors of formulae [(IX-i)+ optionally (IX-2i)]+(IX-3i), which is highly dependent on the operating conditions [respective amounts of the starting diamine of formula (X) and of the halogenated compound of formula (XI); reaction temperature], may be equal to or greater than the desired threshold beyond which, after carrying out the hydrosilylation reaction, will be produced grafted functional groups X of formulae (IV-3i) and optionally (IV-4i), deriving from the precursor of formula (IX-3i), the number of which per linear or branched polyorganosiloxane chain will be on average equal to or greater than 2. In this case, the crude reaction product, before being charged to the hydrosilylation reaction, will be purified, for example by distillation under reduced pressure, for the purpose of obtaining a mixture containing the smallest possible molar fraction G' of N,N'-dialkenylated precursor of formula (IX-3i), so that, by carrying out the hydrosilylation reaction, the precursor under consideration results in grafted functional groups X of formulae (IV-3i) and optionally (IV-4i), the number of which per linear or branched polyorganosiloxane chain is on average strictly less than 2.

For example, consideration may be given to a linear polyorganosiloxane chain of formula (V) terminated by units (R$^1$)$_3$SiO and containing 20 siloxy units carrying PD functional groups of X nature; in the formula (V), the situation is therefore that Y=R$^1$ and m=20. In order to satisfy the condition according to which m×G<2, it is necessary for the molar fraction G of the functional groups X of formulae (IV-3i) and optionally (IV-4i) to be less than 2:20=0.1, that is to say that it is necessary to start, in order to carry out the hydrosilylation reaction, with a mixture of precursors in which the molar fraction G' of the precursor of formula (IX-3i) in the combined precursors (IX), which will give rise to the grafted functional groups X of formulae (IV-3i) and optionally (IV-4i), is also less than 0.1 (or 10 mol %, which represents the threshold). In the context of this example and in the case of a crude reaction product containing 10 or more than 10 mol % of N,N'-dialkenylated precursor of formula (IX-3i), such a crude product will be, for example, distilled under reduced pressure for the purpose of obtaining a fraction which is rich (more than 90 mol %) in N-monoalkenylated precursor(s) of formula (IX-i) and optionally C-alkenylated precursor(s) of formula (IX-2i) and which contains the smallest possible amount (less than 10 mol %) of N,N'-dialkenylated precursor of formula (IX-3i).

During this purification stage, all or, failing that, most of the unreacted starting diamine, if any remains in the reaction mixture, will also be removed.

As regards the practical way of carrying out the reaction of the phenylenediamine of formula (X) with the halogenated compound of formula (XI), documents will be found in the prior state of the art which describe, starting from other reactants, procedures which are applicable to carrying out the process under consideration here.

Mention may be made, as phenylenediamine of formula (X), by way of example, of N,N'-bis(sec-butyl)-p-phenylenediamine. On reacting this diamine with, for example, allyl chloride (in this case, in the formula (XI), E=Cl, f=1, D=—CH$_2$— and R$^{11}$=H), the following synthetic diagram is then obtained:

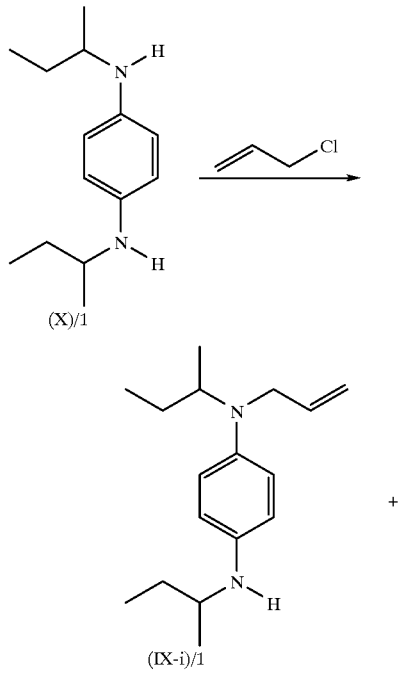

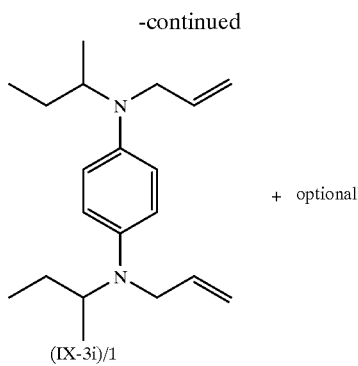

(IX-3i)/1

+ optionally

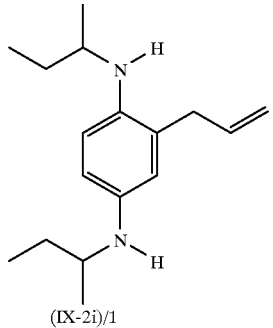

(IX-2i)/1

In the case where it is desired to use, in the hydrosilylation reaction, precursors (ψ) which are formed entirely or largely of the C-alkenylated compound of formula (IX-2i), an aza-Claisen rearrangement is then carried out by subjecting the crude reaction product, as obtained on conclusion of the implementation of the process described above consisting in reacting the phenylenediamine of formula (X) and the halogenated compound of formula (XI), to heating at a temperature of between 150 and 250° C., this rearrangement stage being followed, if needs be, by purification as indicated above.

The unsaturated precursors (Ξ), from which the W functional groups derive, are compounds having an ethylenic unsaturation, situated at the chain end, capable of reacting in a hydrosilylation reaction in the presence of a catalyst based on a metal from the platinum group.

As compounds (Ξ), mention may be made, as examples, of 1-octene, 1-undecene, 1-dodecene, 1-tridecene, or methyl or ethyl undecenoate.

The compounds according to the invention, composed essentially of a polyorganosiloxane containing PPD functional group(s) and optionally compatibilizing functional group(s) can be used, and this constitutes the third subject of the invention, as antiozonants for natural or synthetic rubbers and in particular for rubbers for tires.

The compounds according to the invention are very advantageously used as antiozonants for protecting rubbers based on one or a number of elastomers chosen from the group formed by: natural rubber, polyisoprene, polybutadiene, poly(styrene-butadiene), polychloroprene, poly(acrylonitrile-butadiene), an ethylene-propylene-diene (EPDM) terpolymer, an ethylene-propylene rubber (EPR) or butyl rubber.

Taking into account the wide possibilities of variations in the relative numbers of the various siloxy units present in the siloxane chain of the polysiloxanes coming within the scope of the invention, these said polysiloxanes can be easily adaptable to the various problems to be solved.

Yet another subject of the present invention comprises rubber compositions, of the type of those targeted above, which are protected against the effects of ozone and which give little or no staining by virtue of the use of an effective amount of at least one compound composed essentially of a polyorganosiloxane containing PD functional group(s) and optionally compatibilizing functional group(s).

More precisely, these compositions comprise, per 100 g of rubbers to be protected, an amount of compound(s) composed essentially of an optionally mixed polyorganosiloxane which contributes at least 3 milliequivalents (meq) of PD functional group(s) and, preferably, from 5 to 20 meq of PD functional group(s). In the present statement, the equivalents of PD functional group relate to the equivalents of PD molecules containing the two nitrogenous residues

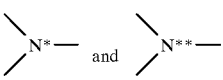

These compositions can additionally contain (an)other antiozonant(s). This is already the case when the optionally mixed polyorganosiloxanes coming within the scope of the present invention are provided in the form of a mixture with the starting para-phenylenediamine from which the precursors (ψ) are prepared and which remains present in addition to the precursor(s) (ψ) used in the hydrosilylation reaction. The other antiozonants which may be used comprise in particular: all those from the group of paraphenylenediamines, the existence of which was recalled above on page 2, 2nd paragraph of the present statement, film-forming waxes, such as for example those of the paraffin type and/or of the microcrystalline wax type, and mixtures of such paraphenylenediamine(s) and wax(es).

These compositions can additionally contain all the additives commonly used in the field of the protection of rubbers and in particular of rubbers for tires.

Thus, use may be made of all or part of the following additives:

concerning the vulcanization system:
  vulcanization agents, such as for example organic peroxides and/or curing agents chosen from sulphur or compounds which donate sulphur, such as thiuram derivatives;
  sulphur-containing curing accelerators, such as for example guanidine derivatives, thiazole derivatives and sulphenamide derivatives;
concerning (an)other additive(s):
  fillers, such as for example carbon black, silica, zinc oxide and titanium;
  coupling agents for coupling the fillers to the elastomers of the rubber;
  antioxidizing agents;
  plasticizing agents or oils.

The rubber compositions thus protected against ozone can be applied in the form of tires for automobiles. However, other articles may be concerned, such as for example: conveyor belts, power transmission belts, flexible piping, roofing membranes, couplings, expansion joints, vibrational extractors or cable sheathing.

In all these applications, the present invention provides effective protection against ozone and does not produce a displeasing brown efflorescence on a black or white surface and in particular on the region of the sidewall of a tire which is particularly subject to degradation by ozone.

The following examples illustrate the present invention.

EXAMPLE 1

Example of the Preparation of a Compound Composed Essentially of a Mixed Polyorganosiloxane According to the Invention 1) Preparation of precursors based on N-(2-propen-1-yl)-N,N'-bis(sec-butyl)-p-phenylenediamine [formula (XI-i)-1]

The following are introduced into a 2000 cm³ reactor under a nitrogen atmosphere: 600 g (2.722 mol) of N,N'-bis(sec-butyl)-p-phenylenediamine (commercially available from the Company Monsanto under the trade name Santoflex 44), 357.7 g (2.723 mol) of diisopropylethylamine and 29.1 g (0.287 mol) of triethylamine. The reaction mass is brought to 46° C. 220.9 g (2.887 mol) of allyl chloride are then run in over 90 minutes. The mixture is allowed to react for 7 hours 40 minutes at 55° C.; at the end of this time, the molar degree of conversion of the starting diamine is 84%.

503.4 g (3.77 mol) of a 30% by weight (of NaOH) aqueous NaOH solution is then run in over 35 minutes and the reaction mixture is left stirring for 30 minutes at room temperature (23° C.). At the end of this time, the reaction mass is introduced into a separating funnel where the reaction mass is washed with 650 cm³ of water and where 1702.4 g of organic phase are recovered.

This organic phase is evaporated for 1 hour at 145° C., the evaporation being carried out at $9.31 \times 10^2$ Pa; 704 g of a viscous brown oil are thus recovered. 695.7 g of this oil are rectified using a 1 metre adiabatic column containing metal packing (carrying the trade name Sultzer). The fraction having a boiling point of between 155–158° C. at $1.06 \times 10^2$ Pa is recovered:

mass: 265 g;
molar composition:
starting diamine of formula (X)/1: 3.4%
N-monoallylated precursor of formula (IX-i)/1: 84.6%
C-monoallylated precursor of formula (IX-2i)/1: 10%
N,N'-diallylated precursor of formula (IX-3i)/1: 1%

2) Preparation of a compound composed entirely of a mixed polyorganosiloxane of formula (V) in which: m=19; n=31; p=0; q=0.

The following are introduced into a 250 cm³ reactor equipped with a stirrer system and in which the internal space is maintained under a dry nitrogen atmosphere: 57.9 g of the rectification fraction obtained on conclusion of Stage 1), which has just been discussed (i.e. 0.215 mol of ethylenic unsaturation of allyl type), 23 mg of sodium acetate, 50 nm³ (50 µl) of a solution in divinyltetramethyldisiloxane of a platinum complex containing 12% by weight of platinum attached to divinyltetramethyldisiloxane as ligand (Karstedt catalyst) and 95 cm³ of toluene. The reaction mixture is stirred and brought to a temperature of 90° C.

25 g of a polymethylhydrosiloxane oil (i.e. 0.395 mol of Si—H functional groups) are then run in over 105 minutes, the characteristics of this oil being as follows:

Mn=3160 g,
1580 meq H/100 g,
average structure:

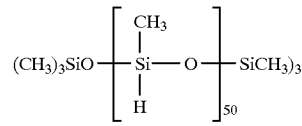

3 hours after having finished running in the oil, the degree of conversion of the SiH functional is groups is 38 mol %. 25 nm³ (25 µl) of the Karstedt catalyst solution are then introduced and the reaction mixture is left to react for an additional 16 hours at 90° C. The degree of conversion of the SiH functional groups is then 43%.

At the end of this time, the introduction is carried out over 90 minutes of 39.8 g (0.23 mol; i.e. 40% excess with respect to the remaining SiH functional groups) of 97% by weight 1-dodecene, and of 25 nm³ (25 µl) of the Karstedt catalyst solution, and the reaction mixture is then left stirring for a further 24 hours at the same temperature of 90° C. At the end of this time, the degree of conversion of the SiH functional groups is total.

The reaction mass is decanted into a separating funnel and is washed four times with 4×500 cm³ of methanol in order to extract the residual starting diamine of formula (X) and the nonhydrosilylated allylated precursors.

The remaining oil is then dissolved in acetone; 196.6 g of a light-beige emulsion are thus obtained. This emulsion is then evaporated using a rotary evaporator, heating being carried out at 130° C., under a reduced pressure of $6.65 \times 10^2$ Pa, for 2 hours. 63 g of a wax are thus recovered, the characteristics of this wax being as follows:

Mn=13310 g,
143 meq of para-PD functional groups/100 g (i.e. 286 meq of amine functional groups

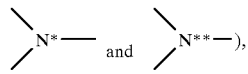

average structure of the wax:

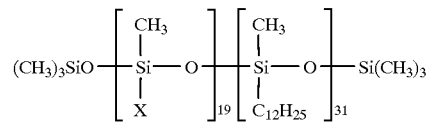

in which the para-PD functional groups X have the following molar composition:

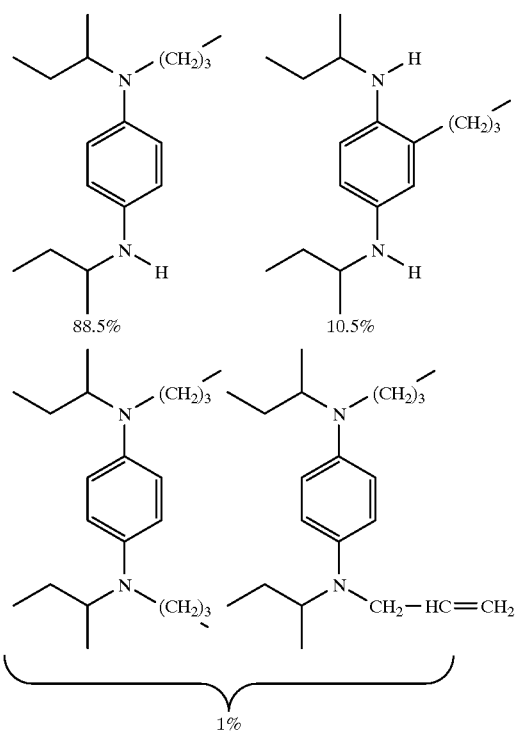

1%

3) Preparation of a compound composed entirely of a mixed polyorganosiloxane of formula (V) in which: m=38.7; n=11.3; p 0; q=0.

The following are introduced into a 250 cm³ reactor equipped with a stirrer system and in which the internal space is maintained under a dry nitrogen atmosphere: 30.1 mg of sodium acetate, 25 nm³ (25 µl) of a solution in divinyltetramethyldisiloxane of a platinum complex containing 12% by weight of platinum attached to divinyltetramethyldisiloxane as ligand (Karstedt catalyst) and 100 cm³ of toluene. The reaction mixture is stirred and brought to a temperature of 90° C.

The following are then run in simultaneously over 2 hours 45 minutes:

10.76 g of a polymethylhydrosiloxane oil (i.e. 0.170 mol of Si—H functional groups), the characteristics of this oil being as follows;
Mn=3160 g,
1580 meq H/100 g,
average structure:

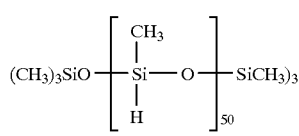

43.36 g of the rectification fraction obtained on conclusion of Stage 1), which has just been discussed (i.e. 0.161 mol of ethylenic unsaturation of allyl type).

When running in is complete, the degree of conversion of the Si—H units is of the order of 44 mol % and stirring is carried out for a further 16 hours; the degree of conversion of the Si—H units is then 83%.

At the end of this time, the introduction is carried out over 5 minutes of 17.2 g (0.104 mol) of 95% by weight 1-dodecene and of 25 mm³ (25 µl) of the Karstedt catalyst solution. After having run in the dodecene, the reaction mixture is allowed to react at 90° C. for a further 24 hours. The degree of conversion of the hydrosilyl functional groups is then 100%.

The reaction mass is decanted into a separating funnel and is washed, in a number of fractions, with 1000 cm³ of methanol, which makes it possible to extract the starting diamine.

The remaining oil is then dissolved in acetone; 160.3 g of a light-beige emulsion are thus obtained. This emulsion is then evaporated using a rotary evaporator, heating being carried out at 130° C., under a reduced pressure of 6.65×10² Pa, for 2 hours. 63 g of a wax are thus recovered, the characteristics of this wax being as follows:

Mn=15125 g,
256 meq of para-PD functional groups/100 g (i.e. 512 meq of amine functional groups),
average structure of the wax:

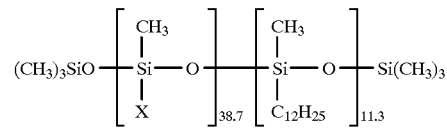

in which the para-PD functional groups X have the following molar composition:

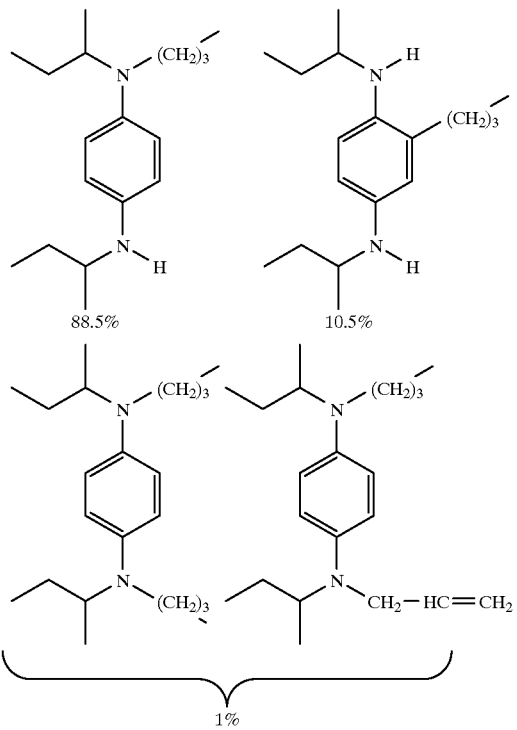

1%

EXAMPLE 2

This Example Illustrates the Use and the Behaviour, on the One Hand, of the Mixed Polyorganosiloxanes According to the Invention Prepared in Example 1, §2 (POS-2) and in Example 1, §3 (POS-3) and of Antiozonizing Agents of the Prior Art in a Formulation for Rubber Representative of Tire Sidewall The preparation is carried out, in an internal mixer (Banbury type), of approximately 1 kg of each of the four mixtures, the composition of which, expressed as parts by weight, is indicated in the following Table I:

| Compositions | 1 | 2 | 3 | 4 |
|---|---|---|---|---|
| NR Rubber (SMR 10) (1) | 50 | 50 | 50 | 50 |
| BR 1220 Rubber (2) | 50 | 50 | 50 | 50 |
| Carbon black (3) | 50 | 50 | 50 | 50 |
| Active ZnO (4) | 3 | 3 | 3 | 3 |
| Stearic acid | 1 | 1 | 1 | 1 |
| Sulphur (5) | 2 | 2 | 2 | 2 |
| TBBS (6) | 1 | 1 | 1 | 1 |
| 6 PPD (7) | 3 (11 meq) | 0 | 0 | 0 |
| Cerelux 120 Wax (8) | 1.5 | 0 | 0 | 0 |
| POS-2 | 0 | 0 | 7.33 (10.4 meq) | 0 |
| POS-3 | 0 | 0 | 0 | 4.08 (10.4 meq) |
| Ferusil B Oil (9) | 7 | 7 | 7 | 7 |

(1) Natural polyisoprene-based rubber, marketed by the Company Wurfbain (Malaysia),
(2) Butadiene polymer, marketed by the Company Shell Chimie under the trade name BR 1220,
(3) Rubber-grade carbon black, marketed by the company Degussa under the trade name Corax N 326,
(4) Rubber-grade zinc oxide, ZnO snow type A, marketed by the Company Vieille Montagne,
(5) Vulcanizing agent,
(6) Accelerator agent based on N-tert-butyl-2-benzothiazolesculphenamide, marketed by the Company Monsanto under the trade name Santocure S,
(7) N-phenyl-N'-(1, 3-dimethylbutyl)-p-phenylenediamine antiozonant, marketed by the Company Monsanto under the trade name Santoflex 13,
(8) Antiozonant of wax type, in the form of a mixture of paraffin wax and of microcrystalline wax, marketed by the Company La Ceresine under the trade name Cerelux 120,
(9) Processing aid based on a petroleum oligomer, marketed by the Company Enichem under the trade name Ferusil B.

The compositions are prepared in the following way.

The following are introduced, in this order and at the times and temperatures indicated between brackets, into the slow mixer which has been preheated to 70° C.:

NR rubber (SMR 10) and BR 1220 (to) (70° C.)

50% of the carbon black and the antiozonizing agent(s) (6 PPD+wax or the POS according to the invention) (to +1 min) (80° C.)

50% of the carbon black, the oil, the ZnO and the stearic acid (to +2 min 30 sec) (105° C.).

Discharge from the mixer (fall of the mixture) is carried out when the temperature of the chamber reaches 145–150° C. (that is to say, about to +5 min 30 sec).

The mixture is left standing for 12 hours and is then introduced into a roll mill (forward speed: 18 r/min; backwards speed: 22 r/min), maintained at 23° C., in order to be calendered therein. The sulphur and then the accelerator TBBS are introduced into this mixer over 8 minutes.

In Composition No. 4, the antiozonizing agent POS-3 was introduced into the roll mill before the sulphur and the TBBS.

After homogenization and passing between the rollers four times, the final mixture is calendered in the form of sheets with a thickness of 2.5 to 3 mm.

The properties are measured on vulcanized compositions: vulcanization is obtained by bringing the compositions to 145° C. for: composition 1: 30 minutes; composition 2: 35 minutes; composition 3: 15 minutes and composition 4: 15 minutes.

1) Properties of resistance to ozone under dynamic stress conditions

The concentration of ozone and the temperature of the tests are respectively 50 pphm (parts of ozone per 100 million parts of air by volume) at 40° C.

1.1 Attack by ozone on the samples was evaluated visually by using the method described below:

For the dynamic tests, 6 test specimens per mixture were tested.

These test specimens were cut out from plates with a thickness of 2 mm, vulcanized to twice the vulcanization optimum, using the NF 46009 hollow punch.

They are preconditioned for 10 min at 40° C. at 20% deformation for the continuous dynamic tests before introduction into the ozonizer for 2 h, 4 h, 8 h, 24 h, 48 h and 72 h.

The test specimens cannot be monitored without interrupting the ozonizer. The dynamic tests are therefore stopped for approximately 1 hour during each monitoring.

Criteria for evaluating the cracks:

| Number of cracks | Size and depth of the cracks |
|---|---|
| A: A small number of cracks | 1. Which cannot be seen with the naked eye but can be confirmed with a magnifying glass of magnification 10. |
| B: A large number of cracks | 2. Which can be confirmed with the naked eye. |
| | 3. The width and the depth of which are less than 1 mm. |
| C: Innumerable cracks | 4. The width and the depth of which are greater than 1 mm and less than 3 mm. |
| | 5. The cracks of which are greater than 3 mm or the test specimens are ready to break. |

1.2 Results:

| Composition | 1 | 2 | 3 | 4 |
|---|---|---|---|---|
| 2 h | Nothing to report | C3 | B2/B4 | B3/C3 |
| 4 h | B1 | C4 | B3/C3 | C4 |
| 8 h | B2 | C5 | C4 | C4/C5 |
| 24 h | C4/C5 | broken | C5 | C5 |
| 48 h | broken | broken | broken | broken |
| 72 h | broken | broken | broken | broken |

Comparison of the change in the composition 2 (control) and in the compositions 3 and 4 (according to the invention) shows the protective effect of the compounds of the invention.

The protective effect obtained is highly comparable to that observed with the best system of the prior art based on 6 PPD and on wax (composition 1).

2) Properties of resistance to flexural fatigue:

The fatigue which is dealt with here is the Monsanto flexural fatigue; it is measured according to the instructions of NFT standard 46-021.

The results obtained are as follows:

| Composition | 1 | 2 | 3 | 4 |
|---|---|---|---|---|
| min. | 203.7 | 21.9 | 67.7 | 97.9 |
| mean | 316 | 32.8 | 277.1 | 404.3 |
| median | 288.2 | 31.8 | 294.6 | 430.8 |
| max. | 480.7 | 53.4 | 452.5 | 667.4 |

Comparison of the change in the composition 2 (control) and in the compositions 3 and 4 (according to the invention) shows that the compounds of the invention give good protection to the rubbers against fatigue.

Comparison of the change in the composition 1 (6 PPD+ wax) and in the compositions 3 and 4 is (according to the invention) shows that the protective effect is greater than that observed with the best system of the prior art.

3. Properties of resistance to staining:

3.1 In order to evaluate the staining, the Inventors have developed a test based on NF standard T 46-031. The migration of the antiozonants into the surface of a white rubber covulcanized on the tested mixtures is evaluated by colorimetry (L parameter). The samples are first aged in an oven at 70° C. (1d, 5d and 9d) and then under UVB (24 h).

Preparation of the white control:

The white control has the following composition (in parts by weight):

| | |
|---|---|
| BX-2 (1) | 20 |
| NR (2) | 40 |
| SBR 1502 (3) | 20 |
| EPDM (3708) (4) | 20 |
| TiO$_2$ | 15 |
| Silica Z85 (5) | 30 |
| Stearic acid | 1 |
| Microcrystalline wax (6) | 1 |
| ZnO (snow type) (7) | 10 |
| Sulphur (8) | 0.5 |
| DPG (9) | 0.6 |
| TMTD (10) | 1 |

(1) Bromobutyl X2, marketed by the Company Bayer-Polysar,
(2) Natural rubber of SMR 5L type, of Malaysian origin, marketed by the Company Safic-Alcan,
(3) Styrene-butadiene copolymer of 1502 type, marketed by the Company Shell Chimie,
(4) Ethylene-propylene-diene copolymer, marketed by the Company Esso under the trade name Vistalon 3708,
(5) Rubber-grade silica, marketed by the Company Rhône-Poulenc,
(6) Wax marketed by the Company La Ceresine under the trade name Cerelux 132,
(7) Rubber-grade zinc oxide, ZnO snow type A, marketed by the Company Vieille Montagne,
(8) Vulcanizing agent,
(9) Diphenylguanidine,
(10) Tetramethylthiuram disulphide, marketed by the Company Akzo under the trade name Vulcafor TMTD.

The formulation is prepared in the following way:

The following are introduced, in this order and at the times and temperatures indicated between brackets, into a Banbury-type internal mixer rotating at 72 r/min: BX-2, NR, SBR 1505 and EPDM (3708) (to) (60° C.), the stearic acid and the wax (to +1 min 30), the TiO$_2$ and the silica Z85 (to +2 min 30), the ZnO (to +6 min).

Discharge from the mixer (fall of the mixture) is carried out when the temperature of the chamber reaches 118° C. (that is to say, about to +7 min). The mixture is introduced into a roll mill (forward speed: 23 r/min; backward speed: 19 r/min), maintained at 30° C., in order to be calendered therein. The TMTD, the DPG and the sulphur are introduced into this mixer.

Homogenization is carried out and the mixture is passed between the rollers three times.

Preparation of the samples for the staining test:

The white mixture is calendered on rollers, speed 18 r/min (forward and backward). The mixture is passed at the minimum distance possible between the rollers, i.e. 0.25 mm. After shrinkage on calendering, the mixture at rest has a thickness of approximately 1 mm.

The black mixtures to be tested are calendered at a distance between the rollers of 0.5 mm. After shrinkage on calendering, the mixtures have a thickness of approximately 2 mm.

The mixtures (white and black) are cut to the exact dimensions of the mould (optimum plate mould, i.e. 125×80 mm).

The white mixture is applied to a terphane sheet with a thickness of 0.07 mm of the same dimension as the mould. The black mixture is placed on the white mixture. Using a small roller, the two mixtures are pressed against each other. A 0.1 mm aluminium sheet, cut to the dimensions of the mould, is placed in the bottom of the latter. The assembly is vulcanized for 20 min at 145° C. under a conventional moulding pressure of 15 MPa.

After vulcanization, it is often necessary to change the terphane sheet, it being possible for the latter to become crumpled within the mould. This change is made immediately after removing from the mould.

The assembly of the 2 mixtures with terphane plus aluminium is held tight using paper clips all around the plate in order to avoid possible contact of air with the white mixture.

The vulcanisates are held at rest at 23° C. for 24 h and then placed in a ventilated oven for 24 hours at 70° C.

A control mixture is formed by vulcanizing the white mixture for 20 min at 145° C., a sheet of terphane plus a sheet of aluminium being placed on each side thereof. This control is then subjected to the same operations as the mixtures to be tested.

3.2—Results:

L parameter after 1, 5 and 9 days at 70° C.:

| Composition Ageing | White control | 1 | 2 | 3 | 4 |
|---|---|---|---|---|---|
| 1 day | 93.75 | 91.37 | 93.31 | 92.18 | 92.66 |
| 5 days | 93.67 | 89.24 | 93.22 | 91.25 | 91.93 |
| 9 days | 93.59 | 88.33 | 93.30 | 90.88 | 91.49 |

L parameter after exposure for 24 hours under UVB:

| Composition Ageing | White control | 1 | 2 | 3 | 4 |
|---|---|---|---|---|---|
| 24 hours UVB | 91.31 | 49.34 | 93.54 | 82.60 | 84.12 |

Comparison of the change in the composition 1 (6 PPD+ wax) and in the compositions 3 and 4 (according to the invention) shows that the compounds of the invention stain less than the antiozonants of the prior art based on 6 PPD.

We claim:

1. A process to protect natural or synthetic rubbers from ozone comprising the step of adding to said rubbers an effective antiozonant amount of a polyorganosiloxane comprising per molecule at least 3 siloxy units including at least one siloxy functional unit of formula:

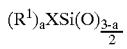 (I)

in which:
the symbols $R^1$ are identical or different and each represent a monovalent hydrocarbon radical selected from the group consisting of linear or branched alkyl radicals having from 1 to 4 carbon atoms and the phenyl radical;
the symbols X are identical or different and each represent a phenylenediamine functional group selected from the group consisting of the radicals of the formulae:

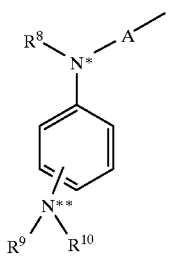 (IV-i)

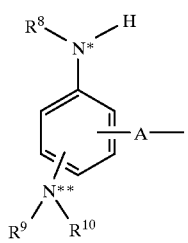 (IV-2i)

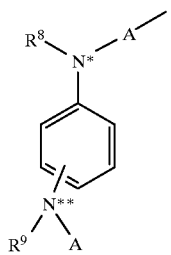 (IV-3i)

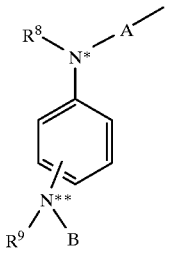 (IV-4i)

and their mixtures, in which formulae:
A is a divalent organic radical of formula:

where: D is a linear or branched alkylene residue having from 1 to 10 carbon atoms, with f being a number equal to 0 or 1; $R^{11}$ is a hydrogen atom or a linear or branched alkyl radical having from 1 to 3 carbon atoms; the CH2 unit is connected to a silicon atom;
B is a monovalent organic radical of formula:

where the D, f and $R^{11}$ symbols have the meanings given above with respect to the A radical;
the $R^8$ and $R^9$ radicals, which are identical or different, are branched alkyl radicals having from 3 to 8 carbon atoms, wherein the carbon carrying the free valency is bonded to a hydrogen atom and to two carbon atoms;
$R^{10}$ is a hydrogen atom;
the A radical of the formula (IV-2i) is in the ortho or para position with respect to the amino residue

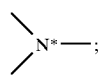

wherein, at least one of the functional groups X corresponds to the formula (IV-i) or (IV-2i), or a mixture of functional groups X of formulae (IV-i) or (IV-2i) with functional groups X of formulae (IV-3i) and, optionally (IV-4i), the number of functional groups X of formulae (IV-3i) and, optionally (IV-4i) grafted onto a linear or branched polyorganosiloxane chain is on average less than 2;
a is a number chosen from 0, 1 and 2.

2. A process according to claim 1, wherein the $R^8$ and $R^9$ radicals, which are identical or different, are isopropyl, sec-butyl, 1,3-dimethylbutyl, 1,4-dimethylpentyl or 1-methylheptyl.

3. A process according to claim 1, wherein the polysiloxane molecule additionally comprises at least one other functional unit of formula:

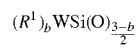 (II)

in which
the symbols $R^1$ have the same meanings as those given above with respect to the formula (I);
the symbol W represents a monovalent group containing a compatibilizing functional group selected from the group consisting of: a linear or branched alkyl radical having more than 4 carbon atoms; a radical of formula $-R^2-COO-R^3$ in which $R^2$ represents a linear or branched alkylene radical having from 5 to 20 carbon atoms and $R^3$ represents a linear or branched alkyl radical having from 1 to 12 carbon atoms; and a radical of formula $-R^4-O-(R^5-O)_c-R^6$ in which $R^4$ represents a linear or branched alkylene radical having from 3 to 15 carbon atoms, $R^5$ represents a linear or branched alkylene radical having from 1 to 3 carbon atoms, c is a number from 0 to 10 and $R^6$ is a hydrogen atom, a linear or branched alkyl radical having from 1 to 12 carbon atoms or an acyl radical of formula $-CO-R^7$ where $R^7$ represents a linear or branched alkyl radical having from 1 to 11 carbon atoms;
b is a number chosen from 0, 1 and 2.

4. The process according to claim 3, wherein the functional groups W are selected from the group consisting of a linear or branched alkyl radical having from 5 to 18 carbon atoms; a radical of formula —$R^2$—COO—$R^3$ in which $R^2$ represents a linear or branched alkylene radical having from 8 to 12 carbon atoms and $R^3$ represents a linear or branched alkyl radical having from 1 to 6 carbon atoms; and a radical of formula —$R^4$—O—($R^5$—O)$_c$—$R^6$ in which $R^4$ represents a linear or branched alkylene radical having from 3 to 6 carbon atoms, $R^5$ represents a linear or branched alkylene radical having from 2 to 3 carbon atoms, c is a number from 0 to 6 and $R^6$ is a hydrogen atom, a linear or branched alkyl radical having from 1 to 6 carbon atoms, or an acyl radical —CO—$R^7$ where $R^7$ represents a linear or branched alkyl radical having from 1 to 5 carbon atoms.

5. The process according to claim 1, wherein the polysoloxane molecule further comprises one or more siloxy units of formula:

in which
the symbols $R^1$ have the same meanings as those given above with respect to the formula (I);
d is a number chosen from 0, 1, 2 and 3;
e is a number chosen from 0 and 1; and
the sum d+e is not greater than 3.

6. The process according to claim 5, wherein the said polyorganosiloxane is selected from the group consisting of:
statistical, sequenced or block polyorganosiloxane polymers of average formula:

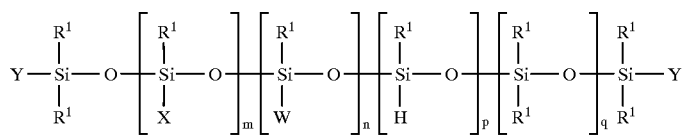

in which:
the symbols $R^1$, X and W have the general meanings given above with respect to the formulae (I) and (II);
the symbols Y represent a monovalent radical chosen from $R^1$, X, W and a hydrogen atom;
m is a whole or fractional number ranging from 0 to 180;
n is a whole or fractional number ranging from 0 to 180;
p is a whole or fractional number ranging from 0 to 10;
q is a whole or fractional number ranging from 0 to 100;
with the conditions according to which:

if m is other than 0 and if n is other than 0: the sum m+n+p+q lies in the range from 5 to 200; the ratio 100m/(m+n+p+q+2)$\geq$0.5; and the ratio 100n/(m+n+p+q+2)$\geq$0.5, this ratio being identical to or different from the preceding ratio;

if m=0 and if n is other than 0: at least one of the Y substituents represents the X radical; the sum n+p+q lies in the range from 5 to 100; and the ratio 100n/(n+p+q+2)$\geq$0.5, if m is other than 0 and n=0: the sum m+p+q lies in the range from 5 to 100; the ratio 100m/(m+p+q+2)$\geq$0.5; and at least one of the Y substituents represents the W radical;

if m=0 and n=0: the sum p+q lies in the range from 5 to 100; one of the Y substituents being the X radical; and the other Y substituent being the W radical; and with the additional condition according to which, if m is other than 0 and if X comprises functional groups of formulae (IV-3i) and optionally (IV-4i), each of the three following products:

the product (m+1)×G, when only one of the Y substituents represents the X radical, or the product (m+2)×G, when both the Y substituents represent the X radical, or the product m×G, when both the Y substituents represent the $R^1$ and/or W radicals, is strictly less than 2, where G is the molar fraction of the functional groups X of formulae (IV-3i) and optionally (IV-4i) in the combined functional groups X of structure (IV);

8. The process according to claim 6, wherein
r is a whole or fractional number ranging from 1 to 4.5;
s is a whole or fractional number ranging from 1 to 4.5;
t is a whole or fractional number ranging from 0 to 0.25;

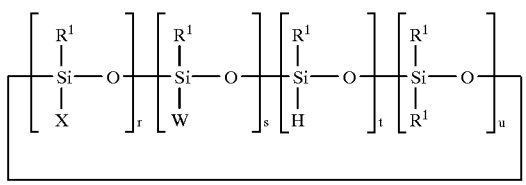

in which:
the symbols $R^1$, X and W have the general meanings given above with respect to the formulae (I) and (II);

r is a whole or fractional number ranging from 1 to 9;
s is a whole or fractional number ranging from 0 to 9;
t is a whole or fractional number ranging from 0 to 0.5;
u is a whole or fractional number ranging from 0 to 5;
the sum r+s+t+u lies in the range from 3 to 10;
with the condition according to which, if X comprises functional groups of formulae (IV-3i) and optionally (IV-4i), the product r×G is strictly less than 2, G being the molar fraction defined above with respect to the formula (V).

7. The process according to claim 6, wherein
the symbols Y represent $R^1$;

m is a whole or fractional number ranging from 1 to 90;

n is a whole or fractional number ranging from 1 to 90;

p is a whole or fractional number ranging from 0 to 5;

q is a whole or fractional number ranging from 0 to 50;

the sum m+n+p+q is a whole or fractional number ranging from 10 to 100;

the ratio 100m/(m+n+p+q+2) lies in the range from 10 to 90;

the ratio 100n/(m+n+p+q+2) lies in the range from 10 to 90, it being possible for this ratio to be identical to or different from the preceding ratio; and with the condition according to which, if X comprises fuinctional groups of formulae (IV-3i) and optionally (IV-4i), the product m×G is strictly less than 2, G being the molar fraction defined above with respect to the formula (V).

and those of average formula:

u is a whole or fractional number ranging from 0 to 2.5;

the sum r+s+t+u is a whole or fractional number ranging from 3 to 5;

with the condition according to which, if X comprises functional groups of formulae (IV-3i) and optionally (IV-4i), the product r×G is strictly less than 2, G being the molar fraction defined above with respect to the formula (V).

9. The process according to claim 1, wherein the rubbers are selected from the group consisting of natural rubber, polyisoprene, polybutadiene, poly(styrene-butadiene), polychloroprene, poly (acrylonitrile-butadiene), an ethylene-propylenediene (EPDM) terpolymer, an ethylene-propylene rubber (EPR) and butyl rubber.

10. The process according to claim 9, wherein the rubbers to be protected are elastomers selected from the group consisting of natural rubber, polyisoprene, polybutadiene, poly (styrene-butadiene), polychloroprene, poly (acrylontrilebutadiene), an ethylene-proplene-diene (EPDM) terpolymer, an ethylene-propylene rubber (EPR) and butyl rubber.

11. The process according to claim 10 further comprising the step of adding additives employed in rubber compositions for tires.

12. The process according to claim 1, wherein per 100 g of rubber(s) to be protected, an amount of polyorganosiloxane contributing at least 3 milliequivalents (meq) of phenylenediamine functional group(s), is added.

13. The process of claim 1 comprising the step of making an article made of rubber(s) which is protected against the effects of ozone.

14. The process of claim 13 wherein the said article being a tire or part of a tire.

* * * * *